(12) United States Patent
Kottbus et al.

(10) Patent No.: US 10,081,089 B2
(45) Date of Patent: Sep. 25, 2018

(54) METHOD FOR THE MULTI-STAGE GRINDING OF WORKPIECES, AND VACUUM TABLE, STORAGE CONTAINER, STRIPPING DEVICE AND PLANT FOR CARRYING OUT THE METHOD

(71) Applicant: Dula-Werke Dustmann & Co. GmbH, Dortmund (DE)

(72) Inventors: Frank Kottbus, Ahaus (DE); Knut Müller, Dortmund (DE)

(73) Assignee: DULA-WERKE DUSTMANN & CO. GMBH, Dortmund (DE)

( * ) Notice: Subject to any disclaimer, the term of this patent is extended or adjusted under 35 U.S.C. 154(b) by 979 days.

(21) Appl. No.: 14/388,343

(22) PCT Filed: Mar. 1, 2013

(86) PCT No.: PCT/EP2013/000598
§ 371 (c)(1),
(2) Date: Sep. 26, 2014

(87) PCT Pub. No.: WO2013/143643
PCT Pub. Date: Oct. 3, 2013

(65) Prior Publication Data
US 2015/0044948 A1      Feb. 12, 2015

(30) Foreign Application Priority Data
Mar. 29, 2012   (DE) .................. 10 2012 006 502

(51) Int. Cl.
B24B 1/00            (2006.01)
B24B 7/22            (2006.01)
(Continued)

(52) U.S. Cl.
CPC ............... B24B 7/22 (2013.01); B24B 7/07 (2013.01); B24B 9/06 (2013.01); B24B 27/0038 (2013.01);
(Continued)

(58) Field of Classification Search
USPC ................... 451/41, 269, 333, 335
See application file for complete search history.

(56) References Cited

U.S. PATENT DOCUMENTS 3,425,169 A  *  2/1969  Dunn ...................... B23Q 7/18
                                                            451/269
3,751,857 A  *  8/1973  Price ....................... B24B 5/35
                                                            414/728
(Continued)

FOREIGN PATENT DOCUMENTS

GB          2319097 A       5/1998
IT          MO910129 A1     3/1993

OTHER PUBLICATIONS

International Search Report in related case PCT/EP2013/000598, filed Mar. 1, 2013.
(Continued)

Primary Examiner — Joseph J Hail
Assistant Examiner — Shantese McDonald
(74) Attorney, Agent, or Firm — Polson Intellectual Property Law, PC; Margaret Polson

(57) ABSTRACT

The invention relates to a method for the multi-stage grinding of workpieces (20) made of hard mineral materials using a robot (10). To this end, the workpiece (20) is moved into a processing region (21) and measured and/or oriented there by the robot (10). The robot (10) comprises a grinding head (11) by way of which it then takes up a first abrasive (14) preferably from a storage container (30) and starts a first grinding process. After the first grinding process is com-
(Continued)

plete, the robot (10) releases the first abrasive (14) again and then takes up a second abrasive (14), preferably from the same or some other storage container (30). Then the robot (10) starts a second grinding process, and after the latter is complete, releases the second abrasive (14) again. One or more further grinding processes may be provided, but the grinding method can also be finished after the second grinding process. If further grinding processes are provided, the robot (10) first of all takes up the respective abrasive (14), carries out the grinding process and releases the abrasive (14) again. After the final grinding process is complete, the workpiece (20) is removed from the processing region (21). Furthermore, the invention also comprises a plant (26) for carrying out the method and a stripping device (40), a storage container (30) and a vacuum table (50), by means of which the method can be carried out.

6 Claims, 11 Drawing Sheets

(51) Int. Cl.
| | | |
|---|---|---|
| B24B 9/06 | (2006.01) | |
| B24B 51/00 | (2006.01) | |
| B25J 9/00 | (2006.01) | |
| B25J 11/00 | (2006.01) | |
| B25J 15/04 | (2006.01) | |
| B24B 27/00 | (2006.01) | |
| B24B 7/07 | (2006.01) | |
| B24B 41/00 | (2006.01) | |
| B24B 41/06 | (2012.01) | |
| B24B 49/02 | (2006.01) | |

(52) U.S. Cl.
CPC ........ *B24B 27/0069* (2013.01); *B24B 41/005* (2013.01); *B24B 41/068* (2013.01); *B24B 49/02* (2013.01); *B24B 51/00* (2013.01); *B25J 9/0096* (2013.01); *B25J 11/0065* (2013.01); *B25J 15/0491* (2013.01)

(56) References Cited

U.S. PATENT DOCUMENTS 5,231,803 A * 8/1993 Lanzer ............... B24B 23/03
451/28
2004/0048549 A1 3/2004 Beaudoin

OTHER PUBLICATIONS

International Preliminary Report on Patentability in related case PCT/EP2013/000598, filed Mar. 1, 2013.
Written Opinion of the International Searching Authority in related case PCT/EP2013/000598, filed Mar. 1, 2013.

* cited by examiner

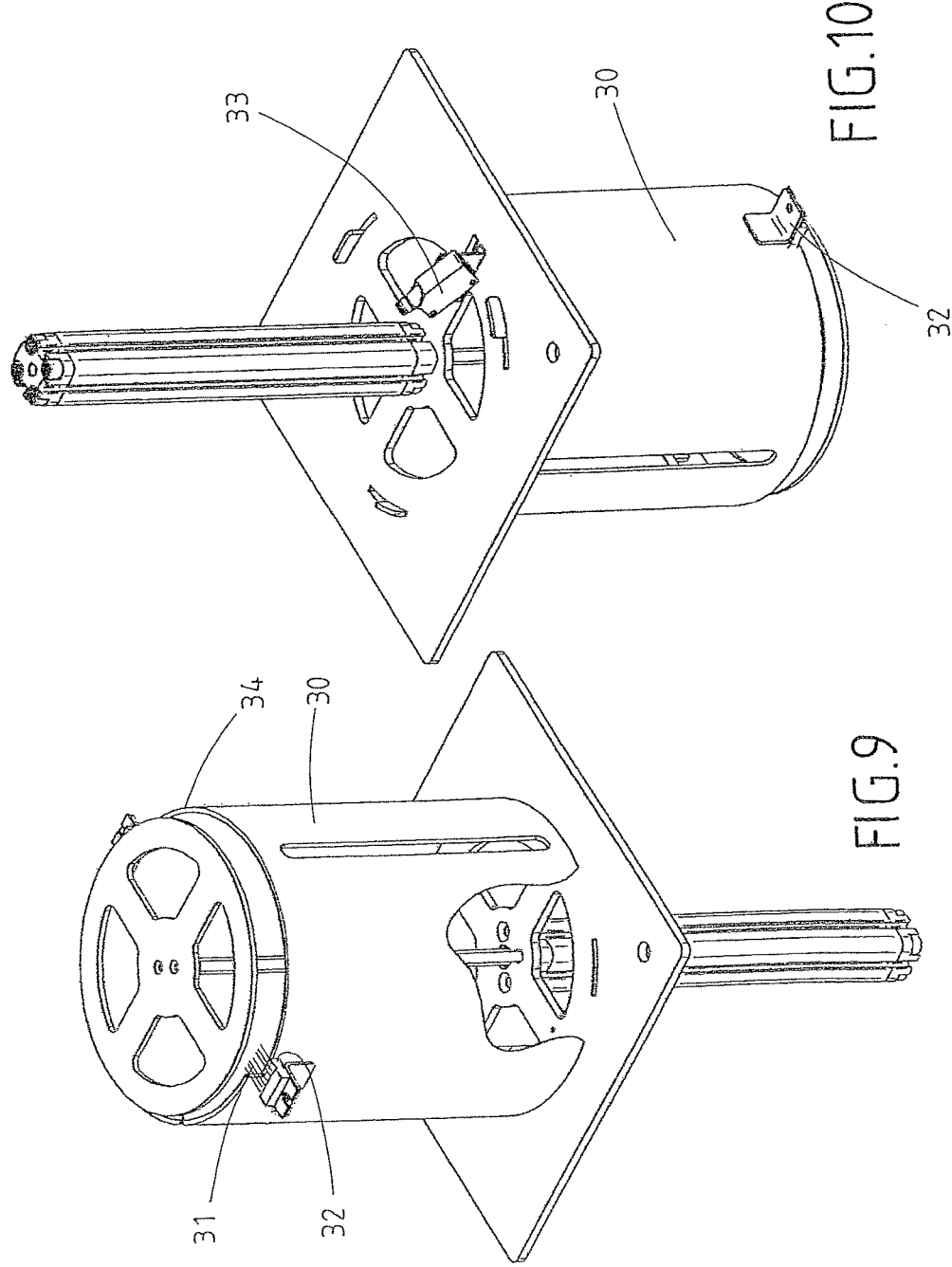

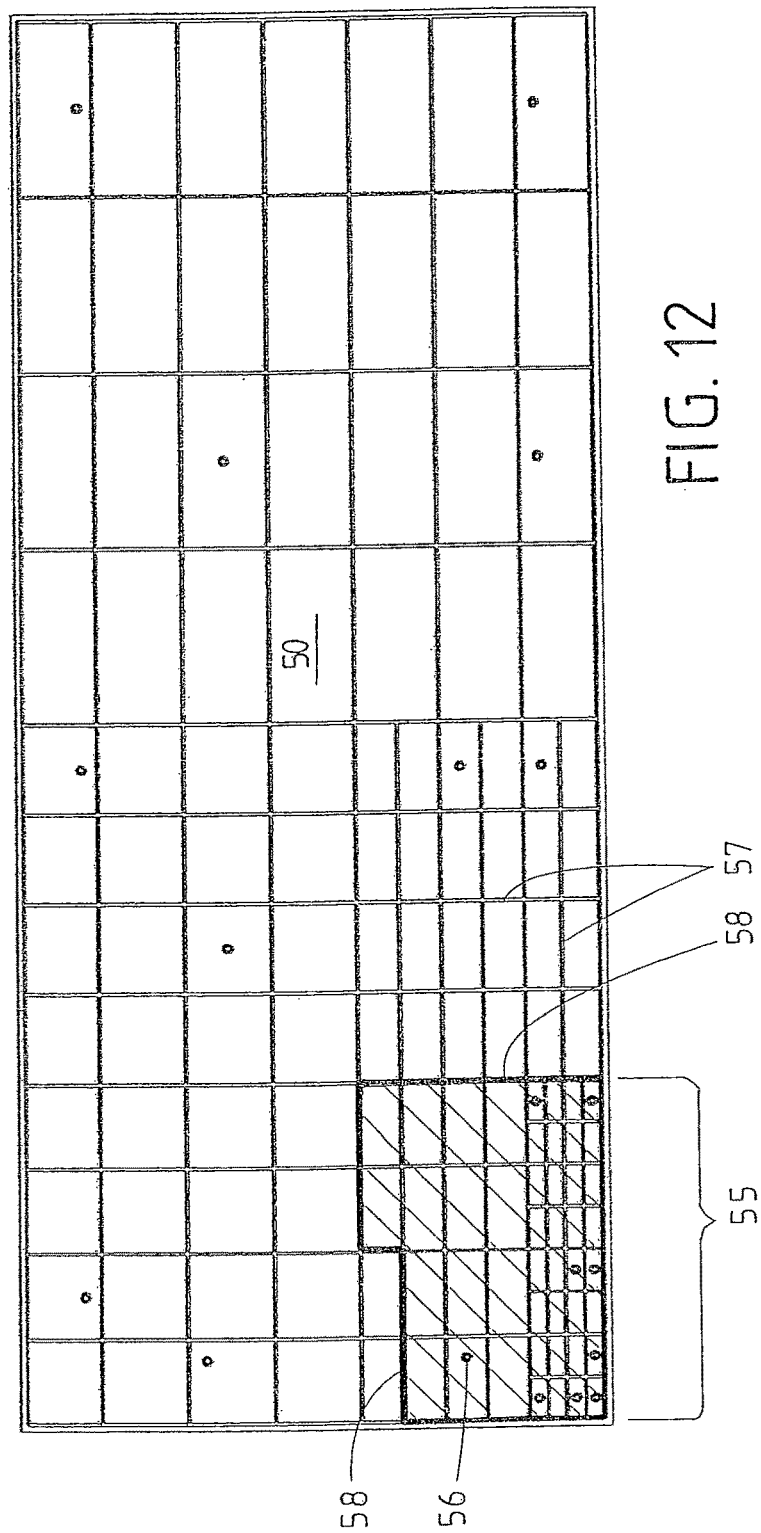

METHOD FOR THE MULTI-STAGE GRINDING OF WORKPIECES, AND VACUUM TABLE, STORAGE CONTAINER, STRIPPING DEVICE AND PLANT FOR CARRYING OUT THE METHOD

BACKGROUND

The invention relates to a method for multi-stage grinding of workpieces, especially made of hard mineral materials, as well as a vacuum table, a storage container, a stripping device and a plant for performing this method. Mineral materials, such as those used in the furniture industry, in interior design or in shop fitting, are often very hard. To maintain the desired surface properties of the components made of these materials, surface processing using a grinding method is often necessary, also frequently using several different grinding means. In the past such grinding methods were performed completely by hand, although this is very time-consuming and thus cost-intensive. The people assigned to perform the manual grinding methods must work especially rigorously and be well trained to obtain a uniform grinding result. Especially in interior design and shop fitting, in addition, a great variety of workpieces must be processed; these may either be planar in shape or have a three-dimensional shape. Therefore it is necessary from time to time to process differently made workpieces by grinding, which additionally makes it difficult to perform this process in an automated manner.

SUMMARY

Therefore the goal of the invention is to develop a grinding method in which different workpieces with different shapes can be processed in a fully automatable manner. Another goal of the invention is to supply a complete plant for performing this method along with individual plant parts that perform certain tasks in the process, for example the reliable alignment and holding of a plate-shaped workpiece as well as the automatable storage and the automatable exchange of different grinding means.

A robot is used for the multi-stage grinding method. First the workpiece is brought into a processing region and there it is measured and/or aligned by the robot to define a null position.

The robot then comprises a grinding head with which it takes up a first grinding means, preferably from a storage container, and begins a first grinding process. Naturally at the beginning of the first grinding process, the grinding head may already be equipped with the required first grinding means. After this first grinding process is complete, the robot releases the first grinding means. Then the robot takes up a second grinding means, preferably once again from a storage container, wherein the grinding means may be located in the same storage container as the first grinding means or in another storage container. Then it begins the second grinding process and after the second grinding process is completed, it releases the second grinding means. Depending on the desired grinding result, one or more additional grinding processes may follow, in which the robot in each case takes up the respective grinding means, performs the grinding process, and then releases the respective grinding means again. Here also, the grinding means can again be taken from a storage container. After the last grinding process is complete, the workpiece is removed from the processing region. A desired grinding process is stored for each workpiece, so that the robot knows the exact grinding path, the grinding means to be used, the speeds, the pressing force and all additional necessary parameters for the grinding process. The second and further grinding means may be identical to the first grinding means or different. This depends on the respective grinding process. Since a unique grinding process can be programmed in for each workpiece, the robot can process many different workpieces that have different dimensions, shapes or desired processing steps. The establishment or definition of the null position is required to correctly perform the appropriate grinding process.

Preferably the respectively used grinding means will be stripped off on a stripping device after the end of the corresponding grinding process. This stripping device enables a simple and automatable stripping off of the grinding means when it is no longer needed for use or when the grinding process to be performed with this grinding means is ended. A stripping sensor may also be provided for detecting whether the grinding means has actually been stripped off. If this is not the case, the grinding head can repeat the stripping attempt until a successful stripping-off process function of the grinding means has occurred. For this purpose, following an unsuccessful stripping attempt, the grinding head will be moved away from the stripping device and rotated briefly to select another point of action on the grinding means for the stripping process. It is also possible for the plant to transmit an error message to the operators after several failed stripping attempts so that the grinding means can then be removed manually.

Grinding means used may comprise commercial disk-like standard grinding means. The grinding means need not already be combined with another component into a component assembly before entering into active connection with the robot or the grinding head. For example, the grinding head may comprise a hook and loop material, while the grinding means has fleece material on its back that adheres to the hook and loop material of the grinding head. In this way, simple and cost-advantageous standard grinding means may be used, and fitting the grinding heads with grinding means as well as stripping off the grinding means after the end of the grinding process can be made simple. Naturally, other possibilities for fastening the grinding means on the grinding head are also conceivable. It is then possible to directly send a spent grinding means directly for disposal, but it may also be kept available for reuse in a later grinding process.

Preferably it is provided for the workpiece to be rotated between two grinding processes, preferably through 180°. After this, either the workpiece can be further processed directly, or first realigned to a defined null position or remeasured to define a null position. In this way it is possible to process the workpiece on several sides without providing an additional robot or the like. For example, a planar workpiece can be processed on a vacuum table; in this case not only can the upward-facing surface be processed, but also the edges. All of the edges of the planar workpiece can be ground by rotating the workpiece through 180°.

The rotation of the workpiece can, for example, be accomplished by a vacuum gripper or a rotary table. A vacuum gripper is especially to be recommended in the case of planar workpieces or in the case of workpieces with flat surfaces. In this case the vacuum gripper usually picks up the workpiece, rotates it through 180° and lays it down again in the processing region. If a workpiece is located on a rotary table, the entire rotary table is rotated through 180°. This is also highly practical for three-dimensional workpieces, which may sometimes also have spherical or curved surfaces. Naturally, rotation by more or less than 180° is also possible, both with the vacuum gripper and with the rotary table.

In a preferred embodiment, the workpiece is processed on at least one nonplanar surface and/or on more than one surface, wherein the surfaces may be arranged in parallel, perpendicular, or at a different angle to one another. In this way it is possible to process workpieces of a great variety of different shapes on multiple surfaces or even process curved, spherical or other shaped surfaces. In this way, workpieces of almost any arbitrary shape can be processed according to the method of the invention.

If the workpiece is to be measured before processing to define a null position, this is advantageously done using at least one measuring rod and/or at least one laser. Thus the exact position of the workpiece can be determined accurately before beginning the grinding process, so that it is no longer necessary to position the workpiece accurately within millimeters on the processing surface. When the robot has determined the exact position of the workpiece, the grinding process can be started.

It is particularly advantageous if the robot is mechanically and electrically connected to the grinding head, the vacuum gripper and the measuring rod at the same interface. The components grinding head, vacuum gripper and measuring rod then each has a suitable counter-interface. The robot then picks up the respective component needed for the current method step. The other components are set aside and stored in such a way that they are easily grasped by the robot. It is especially simple and cost-effectively realizable to provide a single interface on the robot head that will actively interact with the respective counter-interfaces on the respective component.

A preferred method begins in that the robot first brings the workpiece from a storage area into the processing region and there aligns it preferably at a defined null position. The bringing into the processing region by the robot may be done directly or indirectly, with the aid of additional components. "Direct" means that for example the robot brings the workpiece using the vacuum gripper into the processing region or into the defined null position. Indirectly, however, the robot may also issue commands that make the other apparatus located in the plant bring the workpiece into the processing region or the corresponding null position.

Advantageously, the robot also works on disk-shaped workpieces, which it can bring into or out of the processing region with a vacuum gripper. Such a vacuum gripper is gentle to the workpiece and does not damage the surface. In addition, different sized and different shaped disk-shaped workpieces can be easily be transported by the robot in this way.

After the end of the grinding process or the processing of the disk-shaped workpieces, these can be stacked in a storage location. To prevent the freshly processed surface of the workpieces from being damaged, a protective layer may be placed between pairs of workpieces, for example a layer of cardboard.

The robot can additionally have a suction device to suction away the dust produced during the grinding process. The dust can then be transferred to a collection container or sent directly for disposal.

It is particularly advantageous to fix disk-shaped workpieces on a vacuum table. In this case they cannot be accidentally moved or fall off during processing. The vacuum table has one or more vacuum fields that suction the back side of the workpiece at least in parts. It is especially advantageous for the vacuum table to be made tiltable and/or rotatable, since then the vacuum table can be aligned in each case as is required for the processing of the workpiece at that time.

A particularly preferred method for processing plate-shaped workpieces provides that the workpiece is first placed on the vacuum table without a vacuum being applied to the vacuum table. In this case the workpiece can, for example, be placed on the vacuum table by a vacuum gripper on the robot. Next, the vacuum table is tilted in a first direction, as a result of which the workpiece slides under the influence of gravity in the direction of a first stop angle against a first stop bar. It then remains there. The workpiece can then be picked up especially by a vacuum gripper and moved at a second angle toward a second stop bar, so that the workpiece is in contact with both stop bars. Preferably the two stop angles are arranged perpendicularly to one another. When the workpiece is aligned in this way, the vacuum of the vacuum table is turned on, fixing the workpiece on the vacuum table. It is particularly advantageous to turn off the vacuum of the vacuum gripper at this point. In this way the slippage of the workpiece on the vacuum table when the vacuum of the vacuum gripper is shut off can be avoided. The plate-shaped workpiece aligned in this way is now in the defined null position and can be processed as desired by the robot.

Besides the method, the invention also comprises a vacuum table, a storage container and a stripping device for use in performing the aforementioned method. In addition, a complete plant for performing the method with the aforementioned components is covered by the invention. These components and the plant will be discussed in further detail in the following.

Additional advantages and embodiments of the invention will become apparent from the description that follows, the subclaims and the drawings. The invention is represented as follows in the drawings.

BRIEF DESCRIPTION OF THE DRAWINGS

FIG. 9: a storage container, in perspective view,
FIG. 10: the storage container from FIG. 9, viewed from below,
FIG. 12: the detailed surface of the vacuum table from FIG. 11.

DETAILED DESCRIPTION

Figure 1:
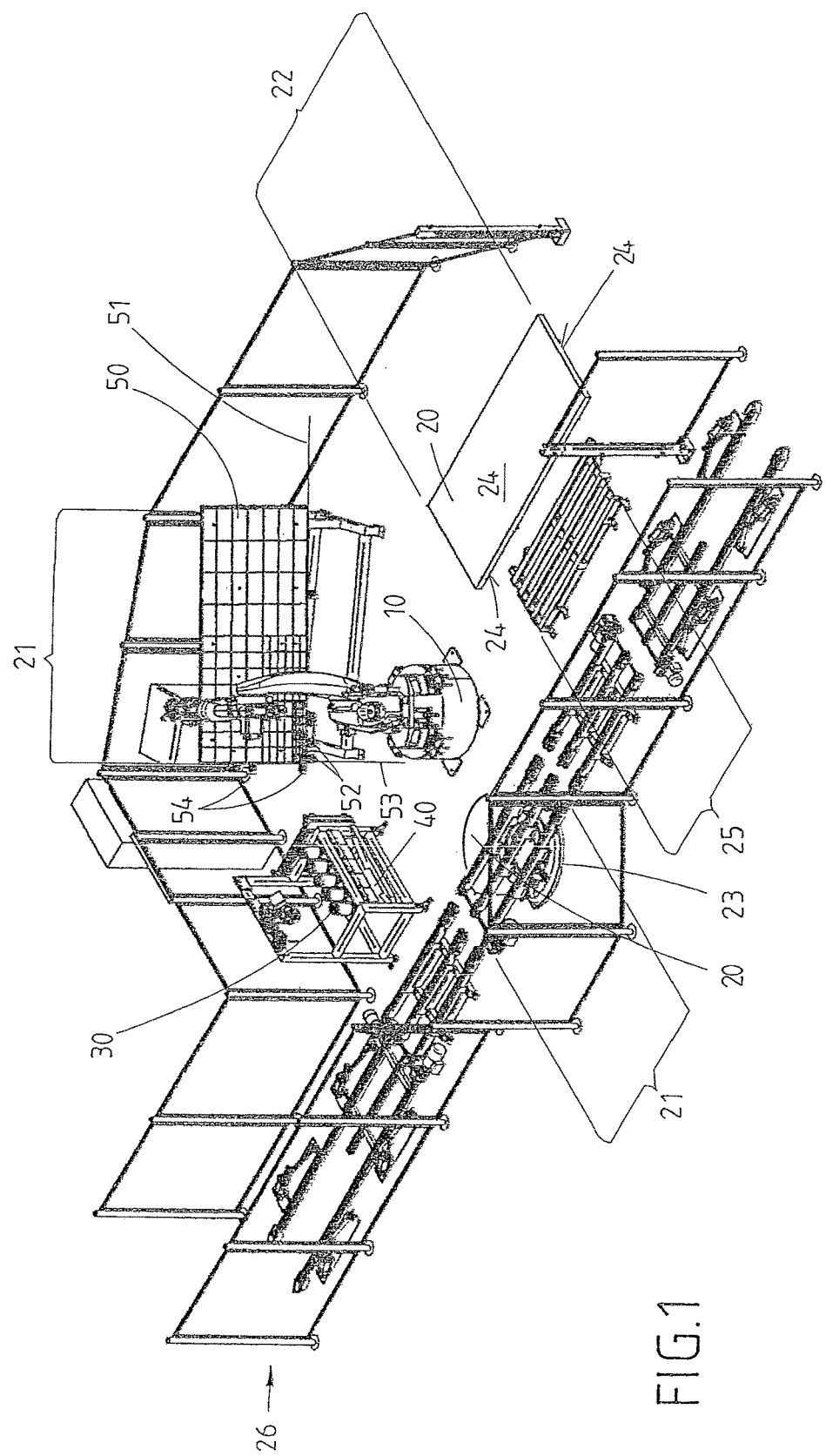
FIG. 1: a plant for performing the method, in perspective view.
Figure 2:
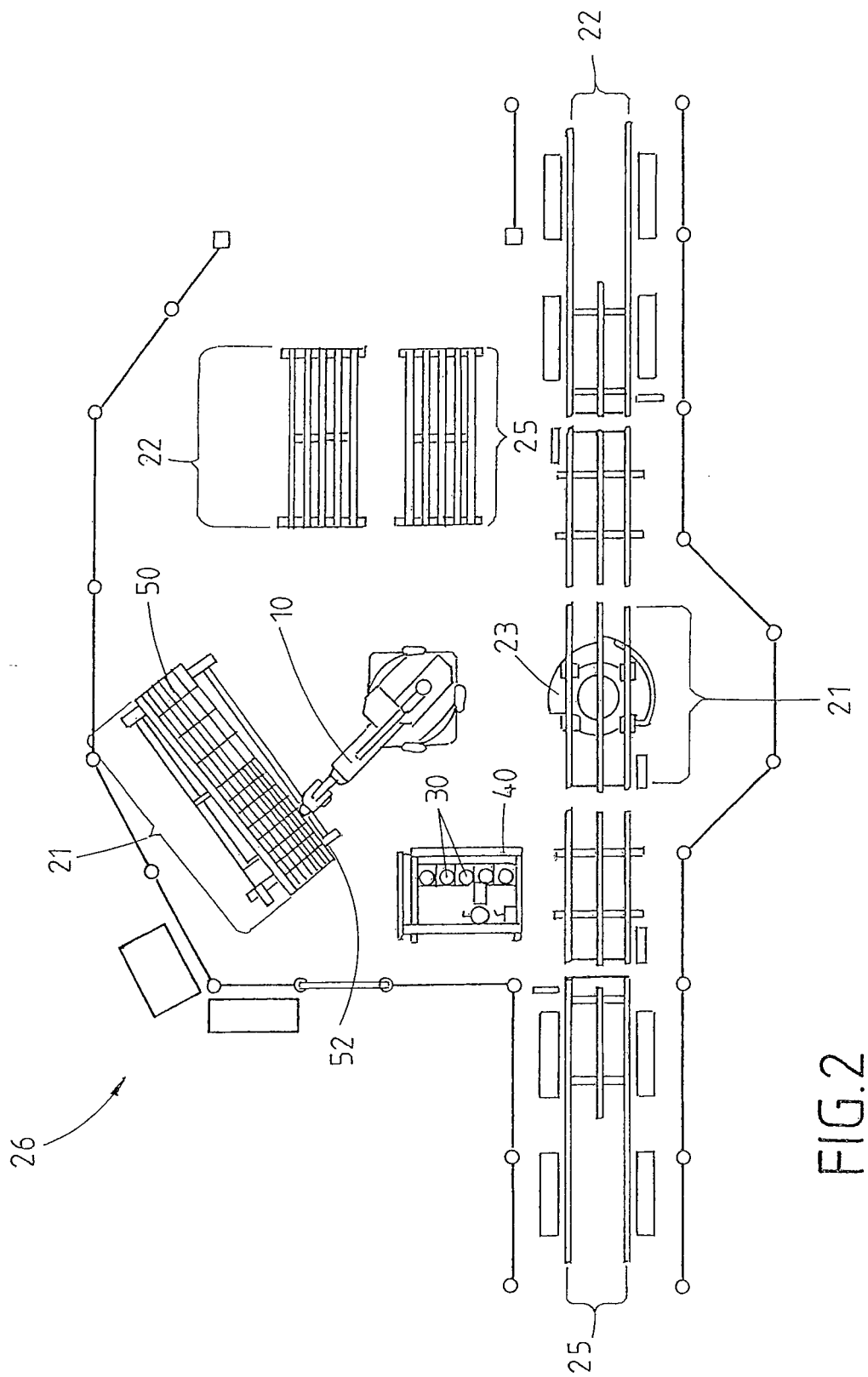
FIG. 2: a plant according to FIG. 1 in top view.

FIGS. 1 and 2 show a plant 26 for performing the above-described method according to the invention. A robot 10 is provided along with a stripping device 40 with several strippers 41 and several storage containers 30. In addition a vacuum table 50 is recognizable. Furthermore, a storage region 22 is provided, designed for plate-shaped workpieces 20, which have planar surfaces 24. Additionally there is a holding area 25 for the plate-shaped workpieces 20 that have already been processed. In FIG. 1 only one workpiece 20 is shown as an example. The robot 10 picks up a workpiece 20 to be processed from the storage area 22, places it on the vacuum table 50, which will be discussed in more detail later, performs the planned grinding work and then places the processed workpiece 20 into the holding area 25 *ab*. Then it turns to the next plate-shaped workpiece 20 or another workpiece 20. In addition to the vacuum table 50, which forms a first processing region 21, a second processing region 21 is also provided. This is especially for processing three-dimensional workpieces 20. This second processing region 21 has a rotary table 23. This can be rotated along with the three-dimensional workpiece 20, so that the workpiece 20 can be processed on several surfaces 24 from several sides before it is removed from the processing region 21. For the workpiece 20 processed on the rotary table 23, the holding zone 25 is located along the pathway designed here as a chain conveyor. The chain conveyor brings the workpieces 20 to and from the rotary table 23. The stocking area 22 is located at the beginning of this pathway. For both stocking areas 22 and holding areas 25, additional components and elements may be provided, which constantly bring fresh workpieces 20 into the stocking area 22 and remove fully processed workpieces 20 from the holding area 25.

Figure 3:
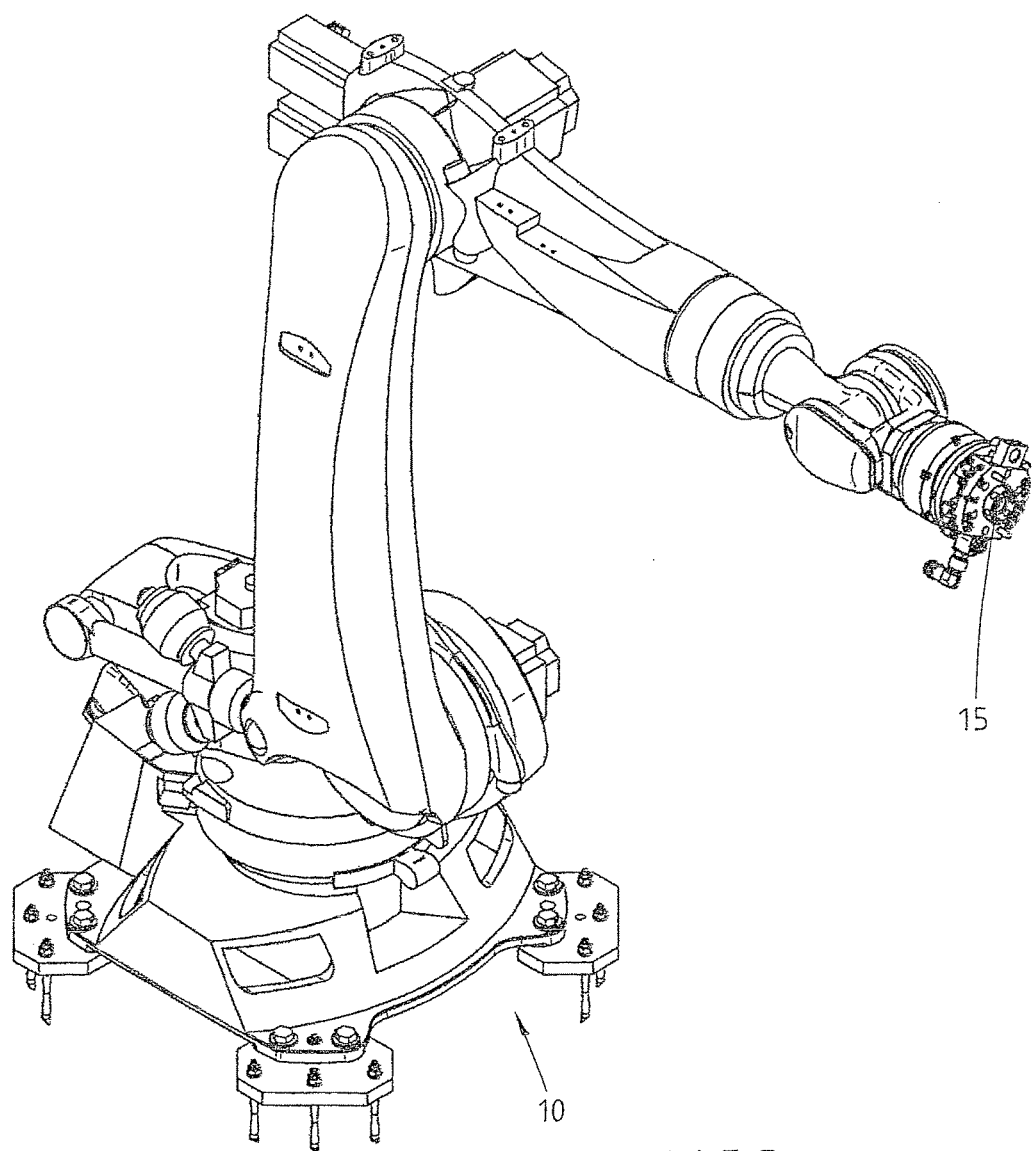
FIG. 3: a robot, such as is used for performing the method.

FIG. 3 shows a robot 10 with interface 15. The robot 10 is rotatable and also has several joints. It is located at a stationary position in the plant 26 shown in FIGS. 1 and 2. The grinding head 11 is supported eccentrically on the robot 10 and is not shown here. Instead the interface 15, by means of which a grinding head 11, a vacuum gripper 12 or a measuring rod 13 can be placed in active connection with the robot 10 are recognizable. These components 11, 12, 13 each also has a counter-interface 16, which can be brought into active connection with the interface 15 on the robot 10.

Figure 4:
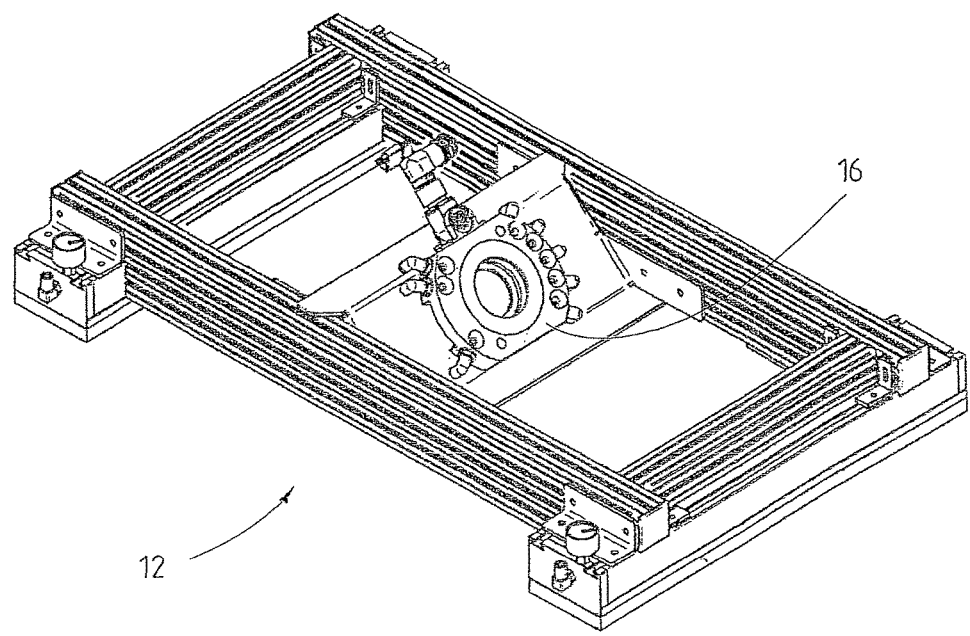
FIG. 4: a vacuum gripper.

In FIG. 4 a vacuum gripper 12 is now shown, which can be used for moving workpieces 20 with planar surfaces 24. The counter-interface 16, with which the vacuum gripper 12 can be brought into active connection with the interface 15 on the robot 10, is visible. The interface 15 and counter-interface 16 not only form a mechanical connection between robot 10 and vacuum gripper 12, but also an electrical connection that serves for controlling the vacuum gripper 12. For example, the vacuum on the vacuum gripper 12 can be controlled via the robot 10 in this way. Similar conditions also apply to the other components, namely the measuring rod 13 and the grinding head 11, which likewise can be brought into active connection with the interface 15 on the robot 10 via a counter-interface 16.

Figure 5:
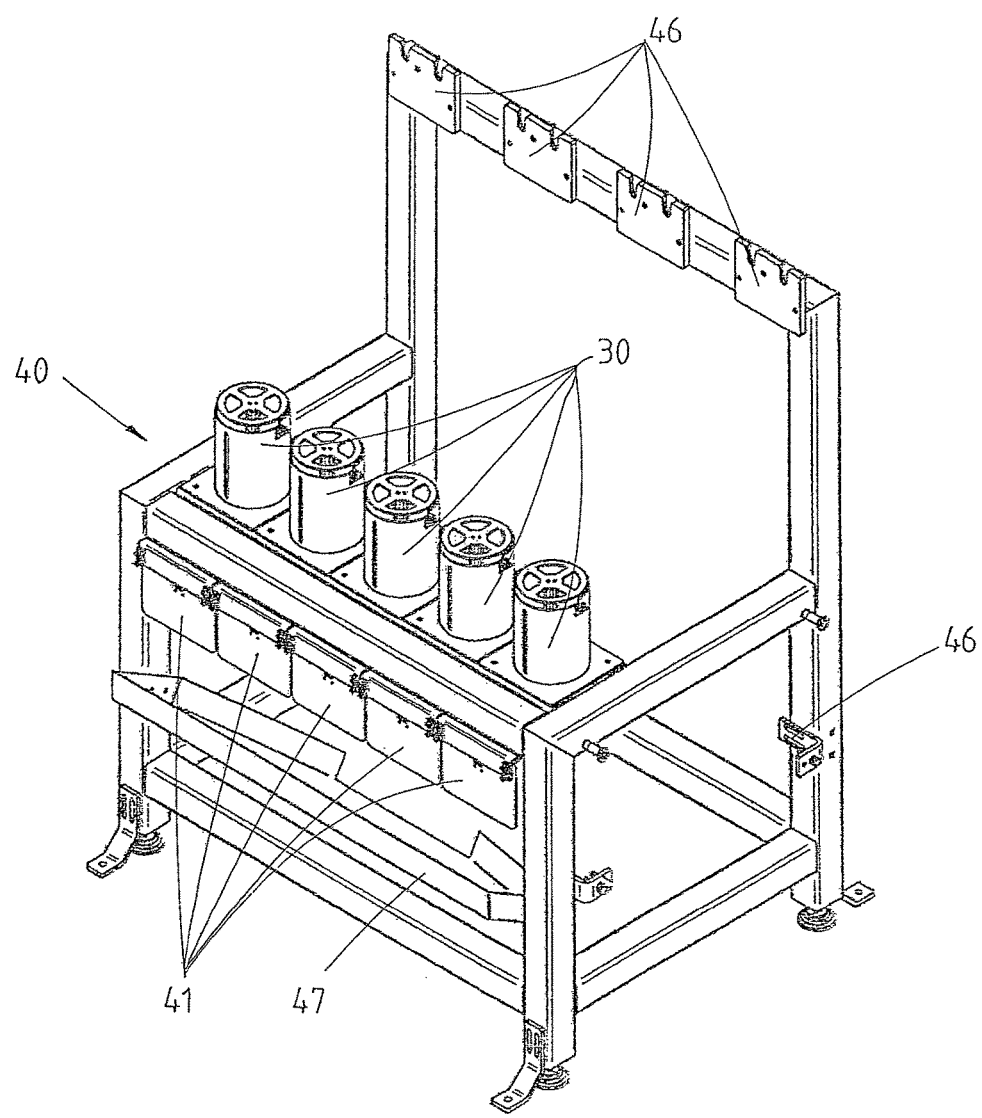
FIG. 5: a stripping device, in perspective view.
Figure 6:
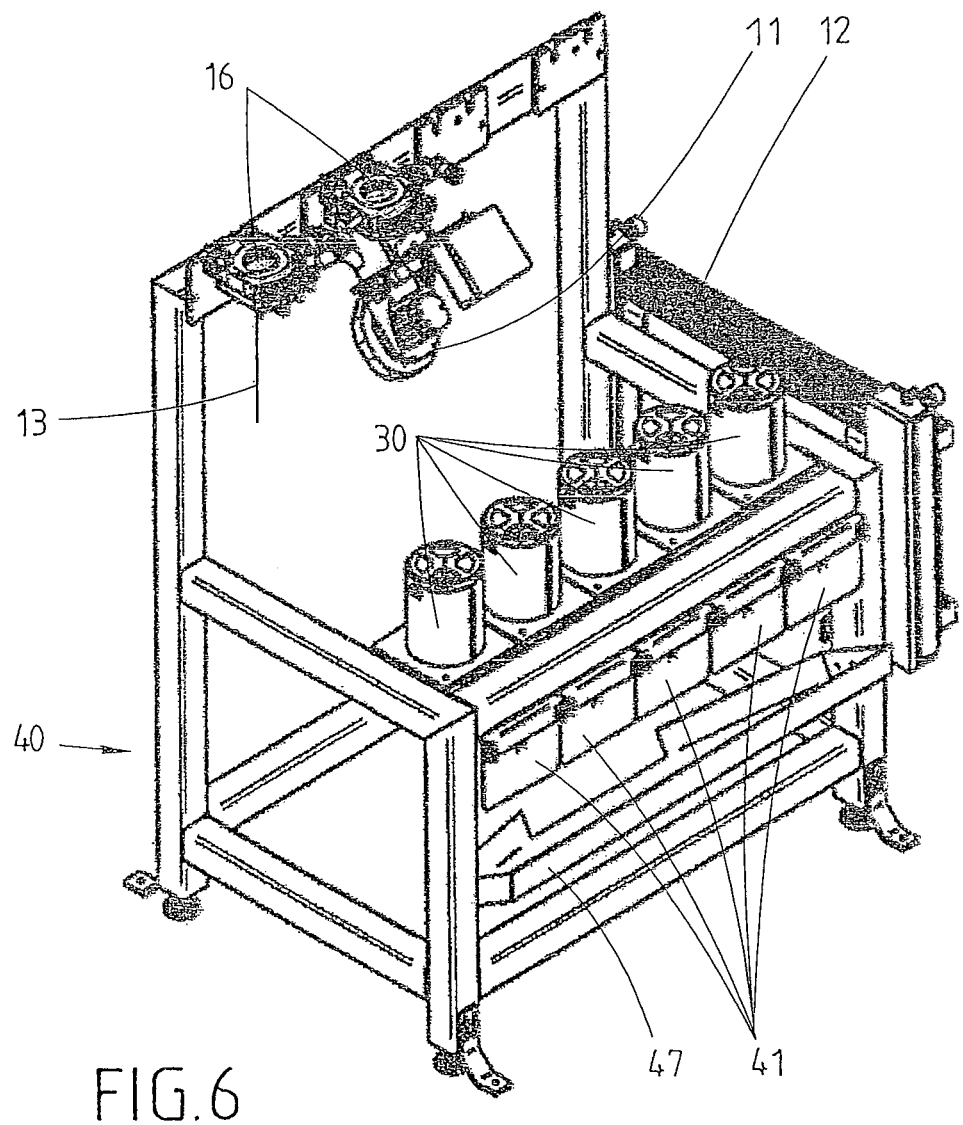
FIG. 6: the stripping device from FIG. 5 with additional components.

FIGS. 5 and 6 show a stripping device 40 according to the invention. This stripping device 40 has several strippers 41, on which the grinding means 14 can be stripped off from the grinding head 11, as will be shown later. The stripping device 40 has several mounts 46, the use of which is more clearly visible from FIG. 6. Here it is shown that both the measuring rod 13 and the grinding head 11 are mounted on a mount 46 each in the upper area of the stripping device 40. The vacuum gripper 12 is mounted on a mount 46 on the side of the stripping device 40. Thus the stripping device 40 offers an advantageous and space-saving possibility for storing components not currently in use, such as grinding head 11, vacuum gripper 12 or measuring rod 13, until they are again needed by the robot 10. The robot 10 can then in turn approach the counter-interface 16 of the respective component 11, 12, 13 with its interface 15 and remove the required component 11, 12, 13 from the stripping device 40 and provide it for use in the method of the invention.

Furthermore, several storage containers 30 are also visible in the stripping device 40, which serve to keep the grinding means 14 available. In den storage containers 30, identical or different grinding means 14 may be arranged, depending on the grinding process to be performed. This will also be explained in further detail in the following.

Figure 7A:
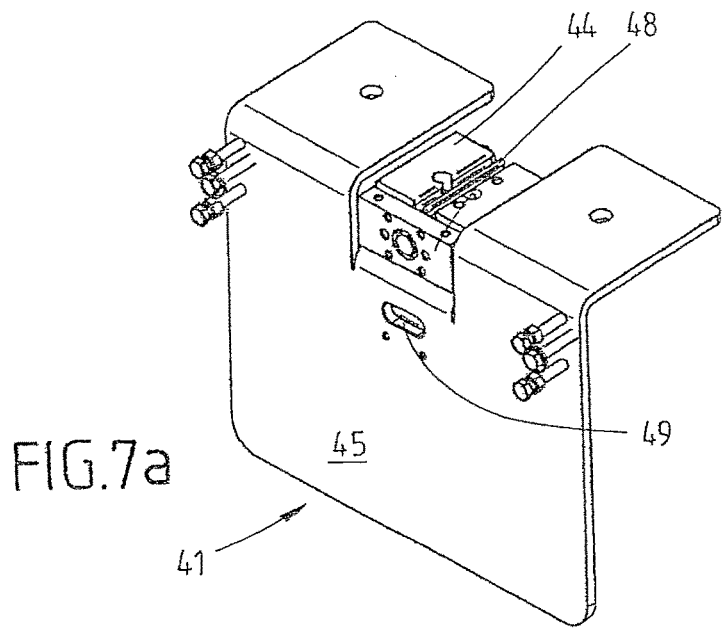
FIG. 7a: the stripper from FIG. 7 without a holder.
Figure 7B:
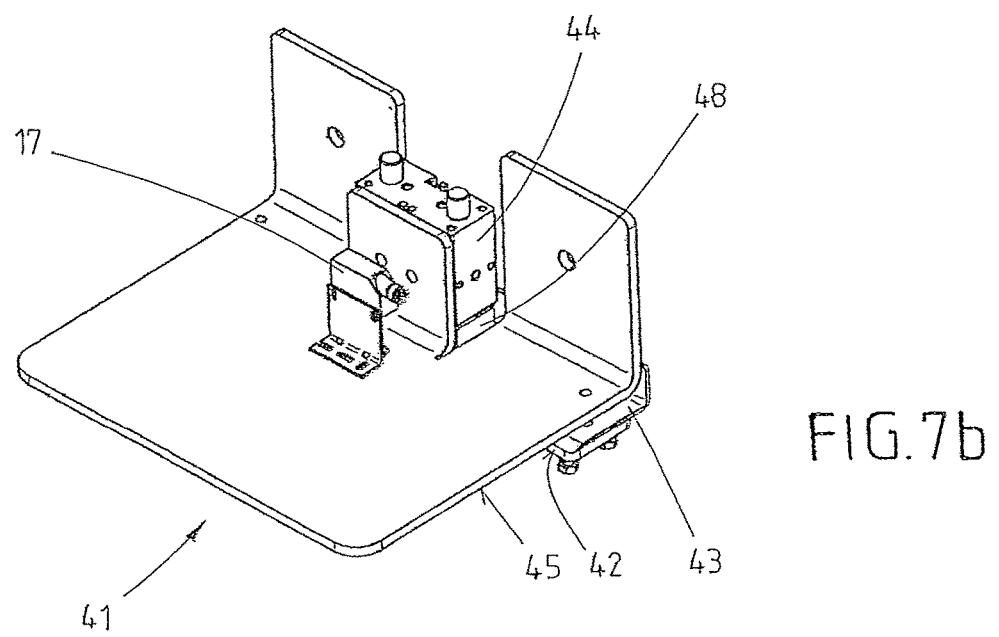
FIG. 7b: the stripper from FIG. 7 from a rear perspective view.
Figure 7:
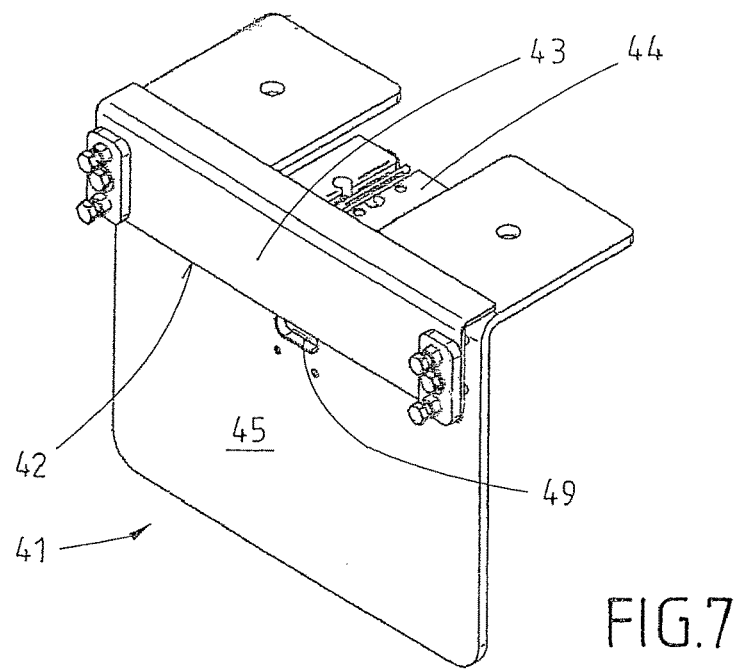
FIG. 7: a stripper without grinding means.
Figure 8:
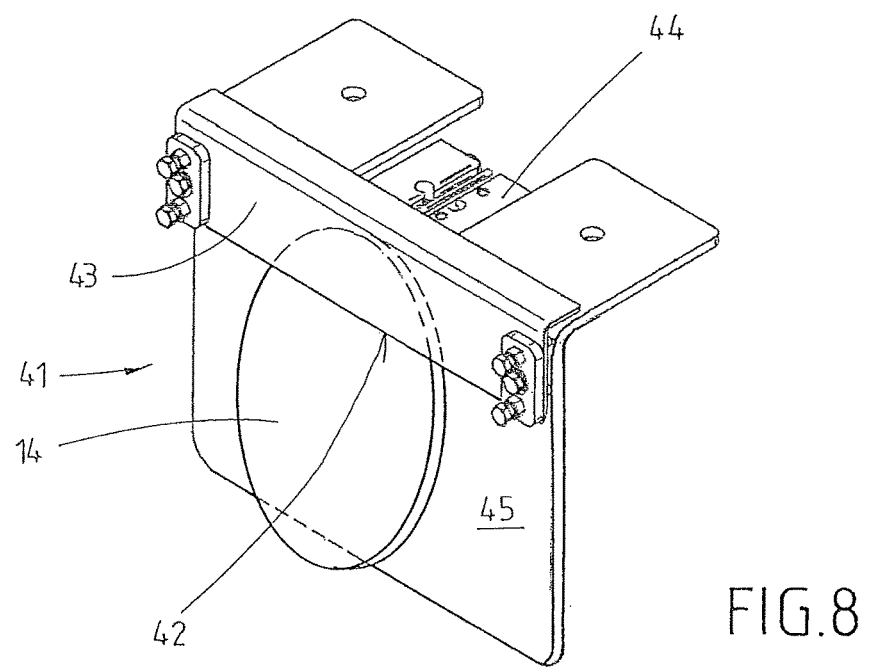
FIG. 8: a stripper with grinding means.

FIGS. 7 and 8 now show the stripper 41 without the stripping device 40. The corner 42 as well as the holder 43 and the surface 45 are visible. If a grinding means 14 is now to be removed from the grinding head 11, the robot 10 with the grinding head 11 moves close to the stripper 41. The robot 10 moves the grinding head 11 with grinding means 14 from the bottom to the corner 42, so that this corner 42 can enter between the grinding head 11 and the grinding means 14. In this way the physical connection between grinding means 14 and grinding head 11 is broken. Then a pressure pad 48 moves from the back of the stripper 41 to the grinding means 14 to clamp it in the holder 43 and thus hold it in place. If the grinding head 11 is then removed from the stripper 41 with the aid of the robot 10, the das grinding means 14 is left behind clamped on the holder 43 and the connection between grinding head 11 and grinding means 14 is broken. The pressure pad 48 is preferably moved over a cylinder 44, such as a gas pressure or hydraulic cylinder, and pressed against the holder 43, wherein the grinding means 14, as shown in FIG. 8, is clamped between the holder 43 and the pressure pad 48. The grinding means 14 can now remain in this clamped position on the stripper 41 until it is again needed in grinding process. Then the robot 10 with the grinding head 11 can move to the stripper 41 or the grinding means 14 located there and make contact with it. The pressure pad 48 will then be moved with the aid of the cylinder 44 and again release the grinding means 14. The robot 10 can then begin the desired grinding process.

In addition a sensor eye 49 is provided, by means of which a stripping sensor 17 checks whether the grinding means 14 is present on the stripper 41. By this means the robot 10 can check whether the grinding head 11 is free form grinding means 14 and this has been stripped off on the stripper 41. If this is not the case, the robot 10 can repeat the stripping process as described previously.

However, if the grinding means 14 is no longer needed but is to be disposed of, the pressure pad 48 can release the clamped grinding means 14 after removal of the grinding means 11. The grinding means 14 then drops down under the force of gravity, where preferably a disposal device, such as a chute 47, is provided. Such a chute 47 can be seen in FIGS. 5 and 6. The grinding means 14 then slides through the chute 47 into a collecting container or directly to disposal. In this way used grinding means 14, which are no longer needed, are conveyed directly for disposal.

FIGS. 9 and 10 show a storage container 30 according to the invention. The storage container 30 is provided with an open-work bottom which has a pressure cylinder, such as a gas pressure or hydraulic cylinder or the like, that can move the bottom with the grinding means 14 in the storage container 30 upwards or downwards. The bottom is visible in FIG. 9 in the upper area of the storage containers 30. During operation, a number of disk-shaped grinding means 14 can be stored in the storage container 30. These can then be individually removed from the grinding head 11 of the robot 10. Since the grinding head 11 is eccentrically supported on the robot 10, the robot 10 first travels to the upper area of the storage containers 30 to align the grinding head 11 so that it will assume the correct position relative to the grinding means held in the 14 storage container 30. Then the grinding head 11 enters the storage container 30, while from below the pressure cylinder moves the bottom of the storage containers 30 with the grinding means 14 upward and presses the uppermost grinding means 14 against the grinding head 11. Especially when a hook-and-loop connection is used between grinding head 11 and grinding means 14, a firm and secure connection can be produced between these components in this way.

FIG. 10 shows a storage sensor 33 which checks whether grinding means 14 are still present in storage container 30. If this is not the case, the robot 10 with its grinding head 11 automatically moves another storage container 30 up, and a message is issued in the system indicating that grinding means 14 must be refilled into the relevant storage container 30.

To prevent the robot 10 with its grinding head 11 accidentally removing several grinding means 14 at once from the storage container 30, a projection 31 is provided at the outlet area 34 of the storage container 30. This extends into the interior of the storage container 30, so that it touches grinding means 14 located on the grinding head 11 upon exiting the storage container 30. Preferably the projection or projections 31, as shown here, are designed as brushes 32. However, it is also possible to design the projections as lips etc. If the grinding head 11 with several grinding means 14 now passes by the projection 31, the projection 31 or the brush 32 strips off excess grinding means 14 from the grinding head 11. These excess grinding means 14 then drop back into the storage container 30 and can be used in a subsequent work process.

Figure 11:
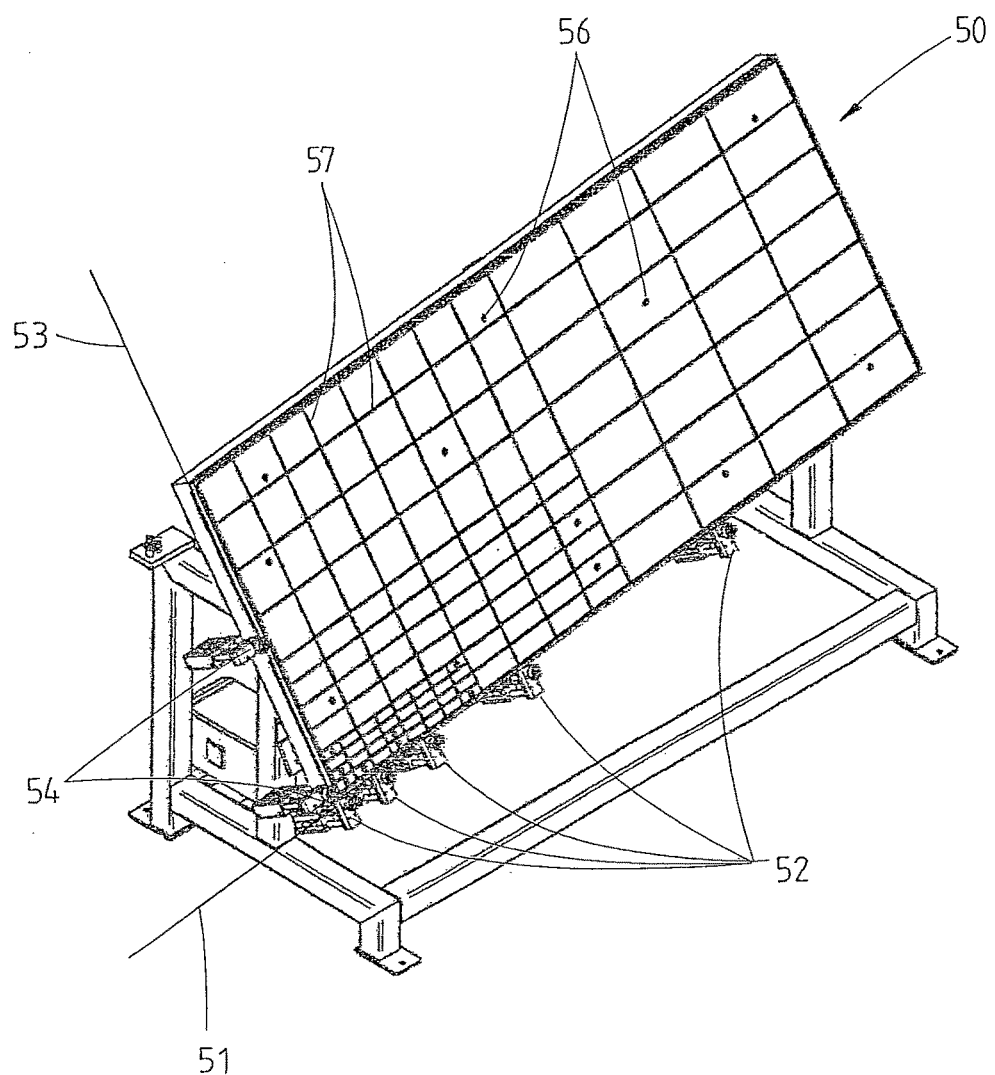
FIG. 11: a vacuum table.

A vacuum table 50 is shown in FIGS. 11 and 12. FIG. 12 shows the surface of such a vacuum table 50 in detail. Also shown in FIG. 11 is the frame located on the vacuum table 50, which ensures that the vacuum table 50 can be rotated and tipped. Several vacuum fields 55 are provided on the surface of vacuum table 50. If workpieces 20 that have openings, recesses, grooves, or the like on their reverse sides are being processed, vacuum losses may occur in the case of conventional solid vacuum tables 50 if the vacuum is applied over the entire reverse sides of the workpieces 20 being processed. The vacuum table 50 according to the invention has several grooves 57 that can accommodate seals 58. In this way, vacuum fields 55 can be produced individually in terms of size and shape. Areas with recesses, grooves, openings and the like on the reverse of the workpiece 20 can be left out here, so that they are not located vacuum field 55. At least one vacuum connection 56 is provided in each vacuum field 55. The vacuum fields 55 can be permanently set up all at once for all workpieces 20 on vacuum table 50. Then depending on the workpiece 20 to be processed, one or several vacuum fields 55 are turned on. thus not all vacuum fields 55 must always be in operation to fix a workpiece 20 on the vacuum table 50. Naturally other methods for defining the vacuum fields 55 are also possible.

By using the vacuum table 50 it is also possible also to process the so-called corners of plate-shaped workpieces 20. For this purpose the first 52 and the second stops 54 are designed so they can be lowered and allow the corners adjacent to them to be processed as soon as the workpiece 20 is fixed in place by the vacuum of the vacuum table 50. If not only these two corners, but also other corners are to be processed, the plate-shaped workpiece 20 for example can be rotated by the vacuum gripper 12, especially through 180°. Then the workpiece 20 can be aligned in its null position and additional corners can be processed.

Finally it should be noted that the embodiments presented here are merely examples of the realization of the invention. It is not limited to them. Instead, changes and modifications are possible. In particular it is advantageous to store the working processes for all possible workpieces in the form of computer programs or instructions. When this is done, it is only necessary to state which workpieces are to be processed with the aid of the robot and the parameters needed for processing will be automatically transmitted to the plant or the robot. In this connection, a higher control is particularly advantageous, by means of which all devices and processes of the plant can be controlled. Thus not only the robot, but also the vacuum table, the stripping device, the rotary table, the conveyor devices such as chain conveyors and the like can be controlled in this way. Such control can also be operated by a single operator, who can input new parameters for the workpieces or specify which workpieces are to be processed.

Furthermore the control can also specify various parameters or states, for example that storage containers are empty, that a used grinding means is hanging on the stripper, that the workpieces have finished being processed, etc. The method is obviously not only applicable for workpieces made of hard mineral materials, but also for workpieces made of other materials, such as wood, glass, plastic, stone, metal, composites or the like.

LIST OF SYMBOLS

10 Robot
11 Grinding head
12 Vacuum gripper
13 Measuring rod
14 grinding means
15 Interfaces on 10
16 Counter-interfaces on 11, 12, 13
17 Stripping sensor
20 Workpiece
21 Processing region
22 Stocking region
23 Rotary table
24 Surface of 20
25 Holding area
26 Plant
30 Storage container
31 Projection
32 Brush
33 Storage sensor
34 Outlet area of 30
40 Stripping device
41 Stripper
42 Corner
43 Holder
44 Cylinder
45 Surface
46 Mount
47 Chute
48 Pressure pad
49 Sensor eye
50 Vacuum table
51 First stop corner
52 First stop
53 Second stop corner
54 Second stop
55 Vacuum field of 50
56 Vacuum connection
57 Groove
58 Seal

The invention claimed is:

1. A stripping device for use in a multi-step grinding process of workpieces made of hard mineral materials using a robot, comprising:
   at least one stripper having an edge, a pressure pad, a holder, and at least one cylinder;
   the edge configured to release a physical connection between a grinding means for grinding a workpiece and a grinding head of the robot;
   the pressure pad and the holder configured to clamp the grinding means released from the grinding head by the edge until the grinding means is picked up again by the grinding head or until disposal of the grinding means;
   the at least one cylinder configured to move the pressure pad to press the grinding means against the holder; and
   a disposal device configured to receive the grinding means for disposal, wherein the disposal device comprises a chute arranged underneath the at least one stripper.

2. The stripping device of claim 1, further comprising one or more mounts to hold components when the components are not being used by the robot.

3. The stripping device of claim 2, wherein the components are selected from a group consisting of a vacuum gripper, a measuring rod, and the grinding head of the robot.

4. The stripping device of claim 1, wherein the at least one cylinder is a gas pressure cylinder.

5. The stripping device of claim 1, wherein the at least one cylinder is a hydraulic cylinder.

6. The stripping device of claim 1, further comprising a stripping sensor configured to check whether the grinding means is present on the at least one stripper.

* * * * *